Dec. 23, 1952     C. G. ARGÅRDEN     2,622,301
MOLDING MACHINE FOR HOLLOW STONES AND THE LIKE
Filed May 9, 1951
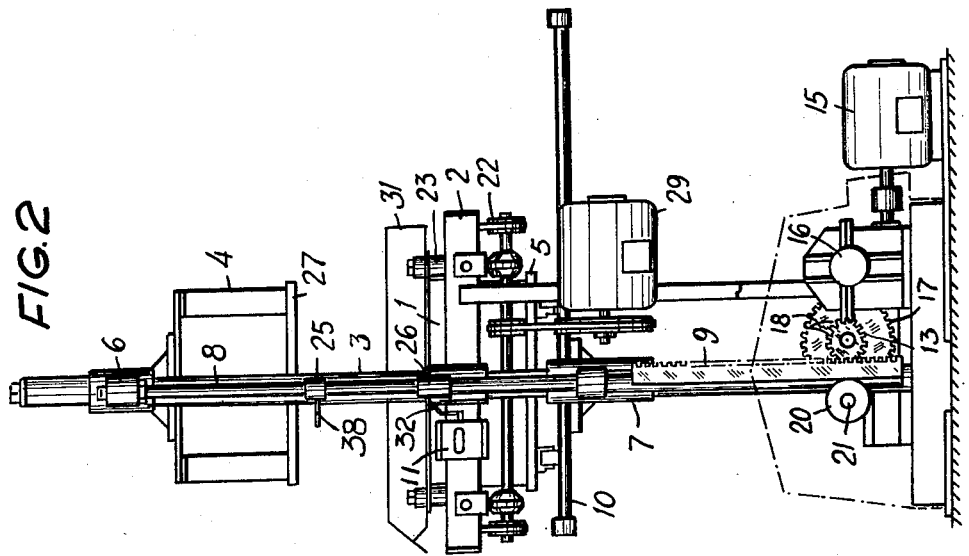
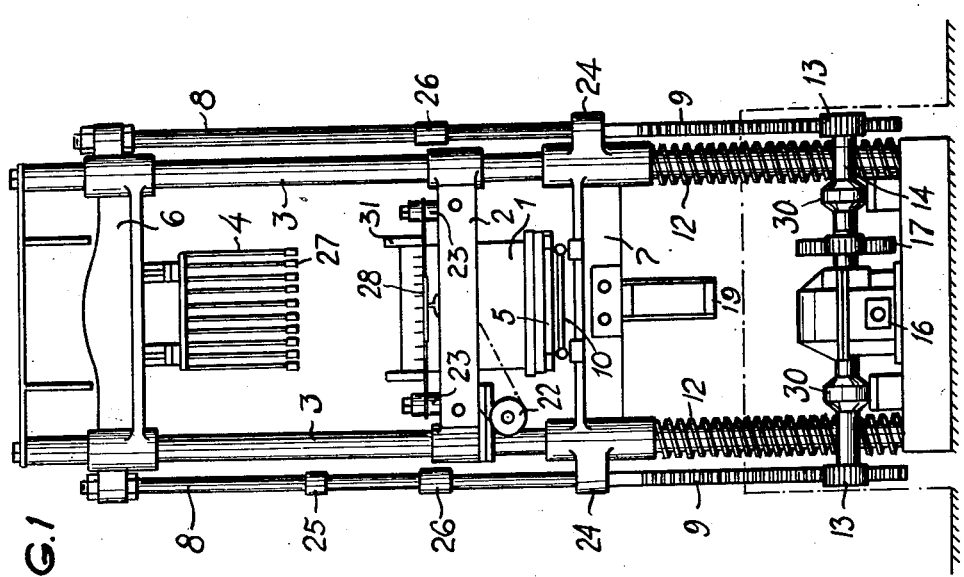
INVENTOR:
Carl Gustaf Argården,
BY: Pierce, Scheffler & Parker,
ATTORNEYS.

Patented Dec. 23, 1952

2,622,301

UNITED STATES PATENT OFFICE 2,622,301

MOLDING MACHINE FOR HOLLOW STONES AND THE LIKE

Carl Gustaf Argården, Stockholm, Sweden, assignor to Svanska Aktiebolaget Tell, Stockholm, Sweden, a corporation of Sweden Application May 9, 1951, Serial No. 225,340
In Sweden May 26, 1950

5 Claims. (Cl. 25—41)

The present invention refers to an arrangement in moulding machines for hollow stones and the like, wherein the stock fed into a mould, such as cement, is packed for instance by vibration, and is forced out of the mould by means of a press plate.

An object of the invention is to provide a suitable structure of a moulding machine of the type having an upper movable beam and with a lower beam which is also movable, whereas the mould arranged between the beams is stationary. More particularly the invention has for its object to arrange the driving means for the upper and lower beams in a suitable manner to ascertain a reliable motion to the beams relatively to the mould for discharging the stone therefrom after moulding.

An object of the invention is further to utilize the motion of the upper beam in the discharging direction for the control of motors for the operation of the machine.

The invention will be described more closely with reference to the accompanying drawings. Fig. 1 shows a front view of a moulding machine, and Fig. 2 shows the machine according to Fig. 1 viewed from the side.

A mould 1 for the stock is stationarily arranged in a frame comprising vertical columns 3 and a transverse frame member 2, which is secured to the columns 3. These columns serve at the same time as guides for an upper beam 6, on which a number of press plates 4 are arranged to press the hollow stones moulded in the mold 1 out of the mould. The columns 3 also have a lower beam 7 slidably mounted thereon, said beam carrying a moulding plate 5 in the form of a removable pallet resting on an extracting device 10 for the pressed stone, the beam 7 with the extracting device 10 and the moulding plate 5 being pressed against the mould 1 by means of springs 12 arranged around the lower portions of the columns 3.

The mould 1 is adapted to be vibrated by means of a vibrating contrivance 22 of ordinary construction, which is connected to the frame member 2 with the aid of packings 23 adapted to suppress the vibrations.

Extending parallel to and outside the columns 3 are driving or drawing bars 8, which are secured in the upper beam 6 and extend slidably through apertures 24 in the lower beam 7, whereby the beam 6 will be perfectly guided during its movement. The drawing bars are provided at the lower ends thereof with toothed racks 9. Arranged on the bars 8 are entraining means formed as displaceable sleeves 26, which cannot pass through the apertures 24. The drawing bars 8 are also provided with displaceable rings 25, which are adapted by means of a suitable operating member 38 to shift the switch arm 32 of the switch mechanism 11 for the operation of a vibrating motor 29 and a press motor 15, respectively.

The power for the pressing operation is taken from the press motor 15 over a worm gearing 16 and a spur gearing 17 to a shaft 14, which is mounted in bearings 30 and provided at each end thereof with pinions 13 splined to the shaft, said pinions being in mesh with the toothed racks 9. Through the two gearings the speed of the motor 15 is reduced sufficiently to provide for a suitable pressing rate. The drawing bars 8 are supported right in front of the pinions 13 by supporting wheels 20 arranged on a shaft 21. The shaft 14 is also provided with an arm 18 adapted to catch a strap 19 secured to the lower beam 7, so that said beam will at the termination of the pressing stroke have a somewhat longer movement imparted thereto than is the case with the upper beam 6, whereby the completely pressed stone can be readily pulled out.

The machine functions in the following manner. At the commencement of the working stroke, the upper beam 6 is in the uppermost position together with the pressplates 4, so that sufficient room is provided for the feeding of stock down into the mould 1, above which an open box 31 is arranged on the frame 2 so as to facilitate the filling of the mould. The vibrating motor 29 is started, so that the stock will be shaken and packed, any surplus stock being then scraped off. After that, the press motor 15 is started, the beam 6 with the pressplates 4 being then pulled down toward the mould 1 with the aid of the toothed racks 9 and the drawing bars 8. The sleeves 26 are adjusted in such positions that, when the pressplate feet 27 are brought into contact with the upper side 28 of the stock in the mould 1, the sleeves will strike against the lower beam 7 and bring the same along with them in the downwardly directed movement, the springs 12 being then compressed at the same time. The current to the vibrating motor 29 is then cut out. The movement continues, until the stock has been pressed out of the mould 1, when the arm 18 on the shaft 14 is adjusted to catch the strap 19, whereby the beam 7 with the stock and the moulding plate 5 will have a more rapid movement imparted thereto than the beam 6, so that the stock will be released from the pressplates 4. When the space between the stock and the pressplates 4 amounts to about one centimeter, the current to the press motor 15 will be cut out by means of the operating member on the ring 25, the machine being then stopped in this position, so that the moulding plate 5 with the pressed stock can be pulled out with the aid of the extracting device 10. The moulding plate 5 with the finished hollow stone is then lifted away and replaced by another plate. The machine operator then starts the motor 15 in the reversed direction of rotation, so that the beam 6 returns into its initial position, the current to the motor 15 being then cut out, so that the beam 7 will at the same time be pressed up against the mould 1 with the aid of the springs 12, whereupon another cycle of operations can commence.

What I claim is:

1. A machine for moulding hollow stones, comprising a frame with vertical columns, a mould mounted in fixed position in said frame, an upper pressing beam displaceable along said columns for discharging the moulded stone from the mould, a lower beam likewise movable along said columns, resilient means supporting said lower beam, driving bars rigidly secured to said upper beam and guided in said lower beam, and means on said driving bars for entraining the lower beam during a displacement in a mould-discharging direction of the upper beam.

2. A machine for moulding hollow stones, comprising a frame with vertical columns and a transverse frame member secured to said columns, a mould supporting in fixed position by said frame member, an upper pressing beam displaceable along said columns above the mould for discharging the moulded stone from the mould, a lower beam movable along said columns below the mould and adapted to carry the moulded stone, resilient means supporting said lower beam, bars rigidly secured to the upper beam and carried slidably through the lower beam, means to displace said upper beam by way of said bars and sleeves on said bars above the lower beam for entraining the latter beam in downward movements of the upper beam, said sleeves being adjustable to various positions along the bars.

3. A machine for moulding hollow stones, comprising a frame with vertical columns and a transverse frame member secured to said columns, a mould supported in fixed position by said frame member, an upper pressing beam displaceable along said columns above the mould for discharging the moulded stone from the mould, a lower beam movable along said columns below the mould and adapted to carry the moulded stone, resilient means supporting said lower beam, bars rigidly secured to the upper beam and carried slidably through the lower beam, an electric motor operably connected with the bars for displacing the upper beam by way of said bars, control means on one of said bars for the motor and adjustable sleeves on the bars above the lower beam for entraining the latter beam in a part of a downward movement of the upper beam.

4. A machine as claimed in claim 3 comprising connecting means between the motor and the bars, said connecting means comprising toothed racks on the bars, toothed wheels meshing with said toothed racks and a worm gearing mounted to reduce the speed of the motor.

5. A machine as claimed in claim 3 comprising a motor for vibration of the mould and means for the control of said motor dependent upon the movement of the upper beam.

CARL GUSTAF ARGÅRDEN.

REFERENCES CITED

The following references are of record in the file of this patent:

UNITED STATES PATENTS

| Number | Name | Date |
|---|---|---|
| 1,921,003 | Romie | Aug. 8, 1933 |
| 2,152,569 | Root et al. | Mar. 28, 1939 |